E. C. BARTOW.
RAIN PROTECTOR FOR WIND SHIELDS.
APPLICATION FILED APR. 18, 1914.
1,132,900.
Patented Mar. 23, 1915.
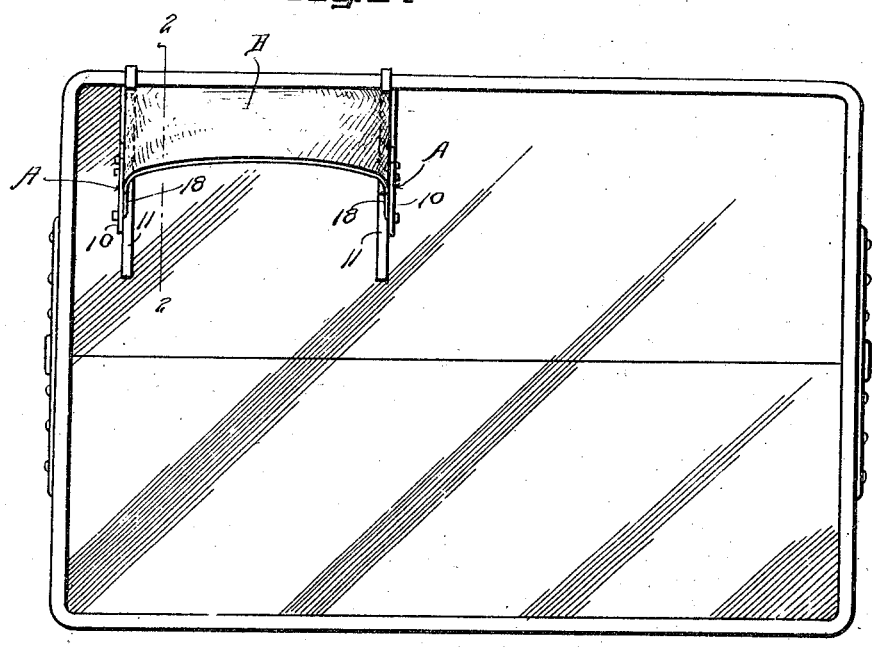
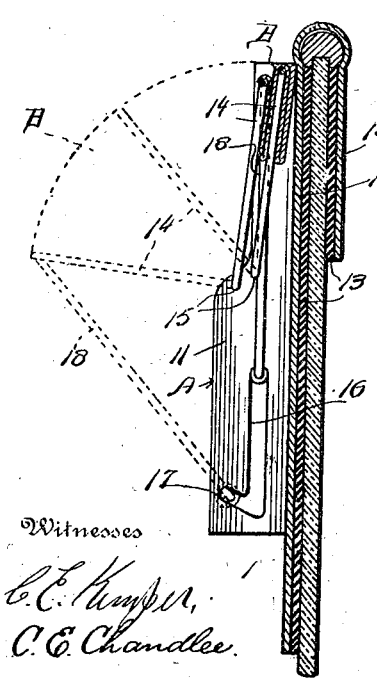
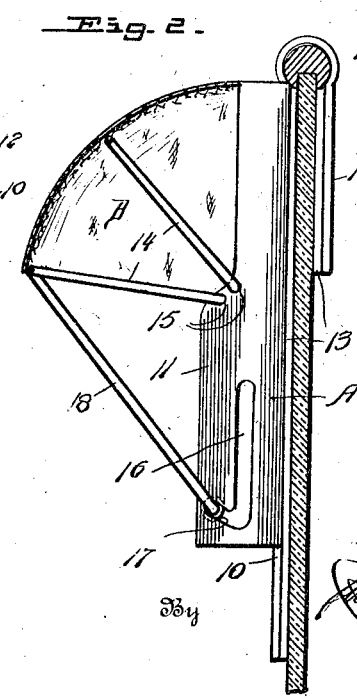
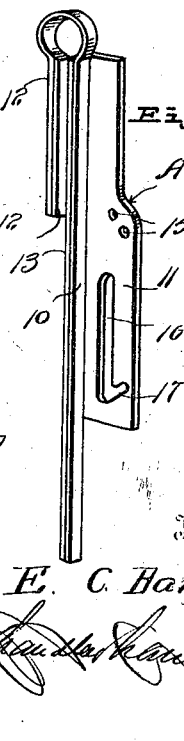
Witnesses
C. E. Kemper
C. E. Chandlee
Inventor
E. C. Bartow
By
Attorneys

UNITED STATES PATENT OFFICE.

EDWARD C. BARTOW, OF LITTLE NECK, NEW YORK.

RAIN-PROTECTOR FOR WIND-SHIELDS.

1,132,900.  Specification of Letters Patent.  Patented Mar. 23, 1915.

Application filed April 18, 1914. Serial No. 832,716.

*To all whom it may concern:*

Be it known that I, EDWARD C. BARTOW, a citizen of the United States, residing at Little Neck, Long Island, in the State of New York, have invented certain new and useful Improvements in Rain-Protectors for Wind-Shields; and I do hereby declare the following to be a full, clear, and exact description of the invention, such as will enable others skilled in the art to which it appertains to make and use the same.

This invention relates to wind shields for automobiles and it has for its object the provision of a hood that may be easily and quickly engaged over a part of the glass of the shield to protect a particular locality of the glass from rain or snow.

A further object of the invention is to provide such a particular construction as will permit of it being folded when it is desired to keep it on the wind shield without being in use.

With the above and other objects of similar nature in view, the invention consists in the construction, combination and arrangement of parts set forth in and falling within the scope of the appended claim.

In the drawings: Figure 1 is a front view of the device applied to a wind shield, and in its extended position, Fig. 2 is a side elevation thereof with the wind shield shown in section, Fig. 3 is a sectional view on the line 2—2 of Fig. 1, with the canopy in its folded position, and Fig. 4 is a detailed perspective view of one of the attaching plates.

Referring now to the drawing, the hood, generally speaking, comprises the side members A which are adapted for removable engagement over the upper edge of a wind shield, and the canopy B that is supported between said members and when in its open or extended position protects a particular locality of the glass of the shield from rain or snow, to permit of the unobscured vision therethrough of the driver of the machine.

In detail, the side members A are each formed from a single blank of metal such as sheet steel, brass or the like and comprise the front plates 10 having the right angular extensions 11, on which the canopy B is supported, and the resilient shield engaging clips 12, said clips and the plates 10 being provided on their adjacent faces with a facing 13 of rubber or other suitable material, to grip the glass and prevent rain or melted snow from running under the hood and to also prevent displacement of the device upon the shield.

The canopy B is secured at its inner corners to the extensions 11 and supported at its intermediate and outer portions by the bows 14, the extensions 11 being enlarged and provided with the openings 15 which receive for pivotal movement the ends of the bows, whereby the canopy may be readily extended for use or folded back against the shield and out of the way. The enlarged portions of the extensions 11 are each further formed with the longitudinal slot 16 and the forwardly directed notch 17 communicating with the lower end thereof, the bars 18 being pivotally connected with the outer end of the lower bow 14 and engageable in said notches to retain the canopy in its extended position, and being adapted to slide out of said notches and upwardly in the slots 16 when the canopy is moved to its folded position.

From the foregoing it will be apparent that there is provided a hood which may be quickly and easily applied in position on a wind shield, and which is constructed in such manner as to permit its being readily extended for use or folded back against the shield and out of the way.

What is claimed is:

A hood including spaced plates, each of said plates being provided with an elongated slot terminating at one end in an angularly directed portion, a foldable canopy arranged between said plates, and arms pivoted to said canopy and slidable in said slots, said arms being engageable at times in the angularly directed portions of the slots to retain the canopy in open position.

In testimony whereof, I affix my signature, in the presence of two witnesses.

EDWARD C. BARTOW.

Witnesses:
 GEORGE A. BARTOW,
 WILLIAM C. H. FOSDICK.